United States Patent
Hosokawa et al.

(10) Patent No.: US 7,715,841 B2
(45) Date of Patent: May 11, 2010

(54) RADIO COMMUNICATION SYSTEM BASE STATION AND MOBILE STATION

(75) Inventors: Yoshifumi Hosokawa, Tokyo (JP); Noriaki Saito, Tokyo (JP); Katsuaki Abe, Kanagawa (JP); Michiaki Matsuo, Tokyo (JP); Yoshito Shimizu, Kanagawa (JP); Junji Sato, Tokyo (JP)

(73) Assignee: Panasonic Corporation, Osaka (JP)

( * ) Notice: Subject to any disclaimer, the term of this patent is extended or adjusted under 35 U.S.C. 154(b) by 540 days.

(21) Appl. No.: 10/572,978

(22) PCT Filed: Oct. 1, 2004

(86) PCT No.: PCT/JP2004/014888

§ 371 (c)(1),
(2), (4) Date: Mar. 22, 2006

(87) PCT Pub. No.: WO2005/034564

PCT Pub. Date: Apr. 14, 2005

(65) Prior Publication Data

US 2006/0293042 A1    Dec. 28, 2006

(30) Foreign Application Priority Data

Oct. 3, 2003 (JP) ............ 2003-345415
Sep. 22, 2004 (JP) ............ 2004-275319

(51) Int. Cl.
*H04Q 7/20* (2006.01)
(52) U.S. Cl. .............. 455/436; 455/437; 455/438; 455/439; 455/400; 455/441; 455/442; 455/443; 455/560; 455/561; 455/552.1; 455/524; 455/525
(58) Field of Classification Search ......... 455/436–443, 455/560–561, 552.1, 524–525
See application file for complete search history.

(56) References Cited

U.S. PATENT DOCUMENTS 5,499,387 A * 3/1996 Chambert ............ 455/436

(Continued)

FOREIGN PATENT DOCUMENTS

JP    08-237728 A    9/1996

(Continued)

OTHER PUBLICATIONS

International Search Report for PCT/JP2004/014888, dated Feb. 22, 2005.

*Primary Examiner*—Lester Kincaid
*Assistant Examiner*—Charles Shedrick
(74) *Attorney, Agent, or Firm*—RatnerPrestia

(57) ABSTRACT

A radio communication system includes a base station of a radio communication system A, a base station of a radio communication system B operation in non-synchronized way with the base station, and a mobile station capable of communicating with both of the radio communication system A and the radio communication system B. The base station includes a radio unit for transmitting/receiving a radio wave to/from the mobile station and a system information estimation unit for estimating the system information on the radio communication system B and outputting the system estimation information. The radio unit of the base station reports the system estimation information on the base station to the mobile station. The mobile station receives the system estimation information on the base station in advance so as to perform effective switching without using a cabled connection from the radio communication system A to the radio communication system B via a relay device or the like.

12 Claims, 9 Drawing Sheets

U.S. PATENT DOCUMENTS

| | | | | |
|---|---|---|---|---|
| 5,732,327 | A * | 3/1998 | Yoshimi et al. | 455/67.11 |
| 6,058,316 | A * | 5/2000 | Takahashi | 455/552.1 |
| 6,393,286 | B1 * | 5/2002 | Svensson | 455/437 |
| 6,522,888 | B1 * | 2/2003 | Garceran et al. | 455/456.3 |
| 6,836,471 | B2 * | 12/2004 | Holma et al. | 370/331 |
| 2004/0082328 | A1 * | 4/2004 | Japenga et al. | 455/436 |

FOREIGN PATENT DOCUMENTS

| | | |
|---|---|---|
| JP | 10-191442 | 7/1998 |
| JP | 2000-092541 A | 3/2000 |
| JP | 2002-135847 A | 5/2002 |
| JP | 2003-018082 A | 1/2003 |
| JP | 2003-134133 A | 5/2003 |
| JP | 2003-199137 A | 7/2003 |
| JP | 2003-219449 A | 7/2003 |
| JP | 2003-264868 A | 9/2003 |
| JP | 2003-526958 A | 9/2003 |
| WO | WO 00/04729 | 1/2000 |

* cited by examiner

RADIO COMMUNICATION SYSTEM BASE STATION AND MOBILE STATION

This application is a U.S. National Phase Application of PCT International Application PCT/JP2004/014888.

TECHNICAL FIELD

The present invention relates to a plurality of separate radio communication systems, a base station of a radio communication system, and a mobile station capable of communications with a plurality of separate radio communication systems.

BACKGROUND ART

A radio communication system of a previous type is described in JP-A-2000-92541. FIG. 9 shows the previous-type radio communication system described in the patent publication. In FIG. 9, the previous-type radio communication system is configured to include a multi-mode radio 801, a cable network 802, a cable telephone 803, a network 804 for a radio communication system A, a base station 805 for the radio communication system A, a cell 806 for the radio communication system A, a network 807 for a radio communication system B, a base station 808 for the radio communication system B, a cell 809 for the radio communication system B, and a relay device 810 for relay use between the base station 805 of the radio communication system A and the base station 808 of the radio communication system B.

The multi-mode radio 801 is available for communications with the radio communication systems A and B. The cell 806 of the radio communication system A and the cell 809 of the radio communication system B are in close proximity to each other or overlapping each other. The base station 805 of the radio communication system A transmits, to the base station 808 of the radio communication system B via the relay device 810, monitor information about monitoring of information such as channel occupation or position registration in the cell at appropriate time intervals, and system information about control channel or others in the radio communication system A. Similarly, the base station 808 of the radio communication system B also transmits, to the base station 805 of the radio communication system A via the relay device 810, the monitor information about monitoring of information such as channel occupation or position registration in the cell at appropriate time intervals, and the system information about control channel or others in the radio communication system B.

When the multi-mode radio 801 in a standby status for communications or incoming calls in the radio communication system A moves into the cell 806 of the radio communication system A, the base station 805 of the radio communication system A forwards the monitor information and the system information about the radio communication system B provided by the base station 808 of the radio communication system B to the multi-mode radio 801.

This is expected to allow the multi-mode radio 801 to have the monitor information and the system information in advance about the base station of the radio communication system being available for switching, and utilizing such information is expected to facilitate switching to the radio communication system B.

The problem with such a previous-type radio communication system is that, for the multi-mode radio 801 to receive information from the base station 808 of the radio communication system B being a switching destination, the base station 808 of the radio communication system B is required to provide information to the base station 805 of the radio communication system A via the relay device 810. For the purpose, a cable connection has to be established between the base stations 805 and 808 via the relay device 810. Moreover, when a radio communication system C is newly provided with a base station in the cell 806 of the radio communication system A and in the cell 809 of the radio communication system B, a relay device is required to be newly provided to establish a cable connection to provide system information about the radio communication system C to the base station 805 of the radio communication system A and the base station 808 of the radio communication system B.

DISCLOSURE OF THE INVENTION

An object of the present invention is to provide a radio communication system being capable of switching, not requiring a cable connection among a plurality of separate radio communication systems via a relay device or others.

Firstly, a radio communication system of the present invention includes: a base station of a first radio communication system; a base station of a second radio communication system including a cell being in close proximity to or overlapping a cell for communications by the base station of the first radio communication system, and operating asynchronous to the base station of the first radio communication system; and a mobile station capable of communications with both the first and second radio communication systems. The mobile station includes: a radio section that receives a radio wave from each of the first and second radio communication systems; and a system information detection section that detects system information of the second radio communication system, and outputs system detection information. The base station of the first radio communication system includes a storage section that stores the system detection information provided by the mobile station. A switching is made between separate radio systems by informing the system detection information from the base station of the first radio communication system to the mobile station in the cell for communications by the base station of the first radio communication system.

In the present invention, this enables effective switching between any separate radio communication systems without requiring a connection via a relay device or others. Even when a new base station is provided, the existence of the base station can be autonomously detected through detection of system information of the radio communication system.

Secondly, in the first invention, in the radio communication system of the present invention, the mobile station includes a position detection section that detects position information of the mobile station. The base station of the first radio communication system includes a storage section that stores the system detection information and the position information provided by the mobile station. A switching is made between the separate radio systems by informing the system detection information and the position information from the base station of the first radio communication system to the mobile station in the cell for communications by the base station of the first radio communication system.

In the present invention, this enables effective switching to any different communication-available radio communication system at the position where the mobile station is located.

Thirdly, a radio communication system of the present invention includes: a base station of a first radio communication system; a base station of a second radio communication system including a cell being in close proximity to or overlapping a cell for communications by the base station of the first radio communication system, and operating asynchronous to the base station of the first radio communication system; and a mobile station capable of communications with both the first and second radio communication systems. The mobile station includes: a radio section that receives a radio wave from each of the first and second radio communication systems; and a system information estimation section that estimates system information of the second radio communication system, and outputs system estimation information. The base station of the first radio communication system includes a storage section that stores the system estimation information provided by the mobile station. A switching is made between separate radio communication systems by informing the system estimation information from the base station of the first radio communication system to the mobile station in the cell for communications by the base station of the first radio communication system.

In the present invention, this enables effective switching between any separate radio communication systems without requiring a connection via a relay device or others. Even when a new base station is provided, the existence of the base station can be autonomously estimated through estimation of system information of the radio communication system.

Fourthly, in the third invention, in the radio communication system of the present invention, the mobile station includes a position detection section that detects position information of the mobile station. The base station of the first radio communication system includes a storage section that stores the system estimation information and the position information provided by the mobile station. A switching is made between the separate radio communication systems by informing the system estimation information and the position information from the base station of the first radio communication system to the mobile station in the cell for communications by the base station of the first radio communication system.

In the present invention, this enables effective switching to any different communication-available radio communication system at the position where the mobile station is located.

Fifthly, in the second or fourth invention, in the radio communication system of the present invention, the position detection section detects absolute position information.

In the present invention, this enables the mobile station to detect the absolute position information.

Sixthly, in the second or fourth invention, in the radio communication system of the present invention, the position detection section detects relative position information.

In the present invention, this enables the mobile station to detect the relative position information from the base station.

Seventhly, a base station of the present invention includes: a first base station of a first radio communication system; a second base station of a second radio communication system including a cell being in close proximity to or overlapping a cell for communications by the first base station, and operating asynchronous to the first base station; and a mobile station capable of communications with both the first and second radio communication systems. The first base station includes: an other system reception section that receives a radio wave from the second base station; a system information estimation section that estimates system information of the second radio communication system from an output of the other system reception section; and a storage section that stores system estimation information being an output of the system information estimation section. A switching is made between separate radio communication systems by informing the system estimation information of the second base station from the first base station to the mobile station in communications with the first base station.

In the present invention, this enables effective switching between any separate radio communication systems without requiring a connection via a relay device or others. Even when a new base station is provided, the existence of the base station can be autonomously estimated through estimation of system information of the radio communication system.

Eighthly, a mobile station of the present invention is capable of communications with both a base station of a first radio communication system, and a base station of a second radio communication system including a cell being in close proximity to or overlapping a cell for communications by the base station of the first radio communication system, and operating asynchronous to the base station of the first radio communication system. The mobile station includes: a radio section that receives a radio wave from each of the first and second radio communication systems; and a system information detection section that detects system information of the second radio communication system, and outputs system detection information. For communications with the base station of the first radio communication system, a switching is made between separate radio communications systems by informing the system detection information to the base station of the first radio communication system.

In the present invention, this enables effective switching between any separate radio communication systems without requiring a connection via a relay device or others. Even when a new base station is provided, the existence of the base station can be autonomously detected through detection of system information of the radio communication system.

Ninthly, in the eighth invention, the mobile station of the present invention includes a position detection section that detects position information of the mobile station. For communications with the base station of the first radio communication system, a switching is made between the separate radio communication systems by informing the system detection information and the position information to the base station of the first radio communication system.

In the present invention, this enables effective switching to any different communication-available radio communication system at the position where the mobile station is located.

Tenthly, in the ninth invention, in the mobile station of the present invention, the position detection section detects absolute position information.

In the present invention, this enables the mobile station to detect the absolute position information.

Eleventhly, in the ninth invention, in the mobile station of the present invention, the position detection section detects relative position information from the base station.

In the invention, this enables the mobile station to detect the relative position information from the base station.

Twelfthly, the mobile station of the present invention is capable of communications with both a base station of a first radio communication system, and a base station of a second radio communication system including a cell being in close proximity to or overlapping a cell for communications by the base station of the first radio communication system, and operating asynchronous to the base station of the first radio communication system. The mobile station includes: a radio section that receives a radio wave from each of the first and second radio communication systems; a system information detection section that detects system information of the second radio communication system, and outputs system detection information; and a storage section that stores the system detection information output from the system information detection section. A switching is made between separate radio communication systems by storing the system detection information in the storage section when no communications are going on with the base station of the first radio communication system, and by informing the system detection information stored in the storage section to the base station of the first radio communication system when communications are through with the base station of the second radio communication system.

In the present invention, this enables effective switching between any separate radio communication systems without requiring a connection via a relay device or others. Even when a new base station is provided, the existence of the base station can be autonomously detected through detection of system information of the radio communication system. When no communications are going on with the base station of the first radio communication system, the system information of the second radio communication system is stored in the storage section so that a switching can be made to the first radio communication system when communications are through with the base station of the second radio communication system.

Thirteenthly, in the twelfth invention, the mobile station of the present invention includes a position detection section that detects position information of the mobile station. A switching is made between the separate radio communication systems by storing the system detection information in the storage section when no communications are going on with the base station of the first radio communication system, and by informing the system detection information and the position information stored in the storage section to the base station of the first radio communication system when communications are through with the base station of the second radio communication system.

In the present invention, this enables effective switching to any different communication-available radio communication system at the position where the mobile station is located.

Fourteenthly, in the thirteenth invention, in the mobile station of the present invention, the position detection section detects absolute position information.

In the present invention, this enables the mobile station to detect the absolute position information.

Fifteenthly, in the thirteenth invention, in the mobile station of the present invention, the position detection section detects relative position information from the base station.

In the present invention, this enables the mobile station to detect the relative position information from the base station.

Sixteenthly, a mobile station of the present invention is capable of communications with both a base station of a first radio communication system, and a base station of a second radio communication system including a cell being in close proximity to or overlapping a cell for communications by the base station of the first radio communication system, and operating asynchronous to the base station of the first radio communication system. The mobile station includes: a radio section that receives a radio wave from each of the first and second radio communication systems; and a system information estimation section that estimates system information of the second radio communication system, and outputs system estimation information. For communications with the base station of the first radio communication system, a switching is made between separate radio communication systems by informing the system estimation information to the base station of the first radio communication system.

In the present invention, this enables effective switching between any separate radio communication systems without requiring a connection via a relay device or others. Even when a new base station is provided, the existence of the base station can be autonomously estimated through estimation of system information of the radio communication system.

Seventeenthly, in the sixteenth invention, the mobile station of the present invention includes a position detection section that detects position information of the mobile station. For communications with the base station of the first radio communication system, a switching is made between the separate radio communication systems by informing the system estimation information and the position information to the base station of the first radio communication system.

In the present invention, this enables effective switching to any different communication-available radio communication system at the position where the mobile station is located.

Eighteenthly, in the seventeenth invention, in the mobile station of the present invention, the position detection section detects absolute position information.

In the present invention, this enables the mobile station to detect the absolute position information.

Nineteenthly, in the seventeenth invention, in the mobile station of the present invention, the position detection section detects relative position information from the base station.

In the present invention, this enables the mobile station to detect the relative position information from the base station.

Twentiethly, a mobile station of the invention is capable of communications with both a base station of a first radio communication system, and a base station of a second radio communication system including a cell being in close proximity to or overlapping a cell for communications by the base station of the first radio communication system, and operating asynchronous to the base station of the first radio communication system. The mobile station includes: a radio section that receives a radio wave from each of the first and second radio communication systems; a system information estimation section that estimates system information of the second radio communication system, and outputs system estimation information; and a storage section that stores the system estimation information output from the system information estimation section. A switching is made between separate radio communication systems by storing the system estimation information in the storage section when no communications are going on with the base station of the first radio communication system, and by informing the system estimation information stored in the storage section to the base station of the first radio communication system when communications are through with the base station of the second radio communication system.

In the present invention, this enables effective switching between any separate radio communication systems without requiring a connection via a relay device or others. Even when a new base station is provided, the existence of the base station can be autonomously estimated through estimation of system information of the radio communication system. When no communications are going on with the base station of the first radio communication system, the system information of the second radio communication system is stored in the storage section so that a switching can be made to the first radio communication system when communications are through with the base station of the second radio communication system.

Twenty-firstly, in the twentieth invention, the mobile station of the present invention includes a position detection section that detects position information of the mobile station. A switching is made between the separate radio communications systems by storing the system estimation information in the storage section when no communications are going on with the base station of the first radio communication system, and by informing the system estimation information and the position information stored in the storage section to the base station of the first radio communication system when communications are through with the base station of the second radio communication system.

In the present invention, this enables effective switching to any different communication-available radio communication system at the position where the mobile station is located.

Twenty-secondly, in the twenty-first invention, in the mobile station of the present invention, the position detection section detects absolute position information.

In the present invention, this enables the mobile station to detect the absolute position information.

Twenty-thirdly, in the twenty-first invention, in the mobile station of the present invention, the position detection section detects relative position information from the base station.

In the present invention, this enables the mobile station to detect the relative position information from the base station.

BEST MODE FOR CARRYING OUT THE INVENTION

In the below, embodiments of the present invention are described by referring to the accompanying drawings.

First Embodiment

A first embodiment of the present invention is an example in which a base station of a radio communication system autonomously estimates the existence of other radio communication systems, and informs the resulting information about the estimated radio communication systems to inside of the cell of its own system.

Figure 1:
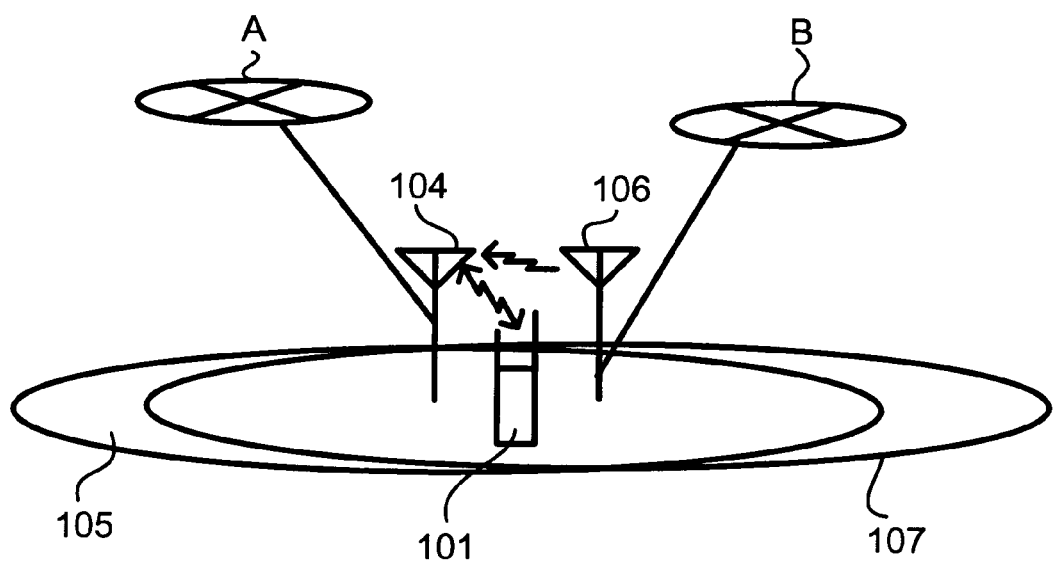
FIG. 1 is a schematic diagram of a radio communication system in a first embodiment of the present invention.

FIG. 1 is a schematic diagram of a radio communication system in the first embodiment of the present invention. In FIG. 1, a mobile station 101 is capable of communications with both a first radio communication system A and a second radio communication system B. A base station 104 of the radio communication system A communicates with any mobile station available for communications with the radio communication system A in a cell 105. A base station 106 of the radio communication system B communicates with any mobile station available for communications with the radio communication system B in a cell 107. The base stations 104 and 106 are not connected to each other over a cable, via a relay station, or others, and are operating asynchronous to each other. Herein, exemplified is a case where the radio communication system A is of a CDMA cellular mode, and the radio communication system B is of a GSM cellular mode. The cells 105 and 107 are positioned in close proximity to or overlapping each other. The mobile station 101 is located in an area where the cells 105 and 107 are overlapping each other, is connected with the base station 104, and is in a standby status for communications or incoming calls.

Figure 2:
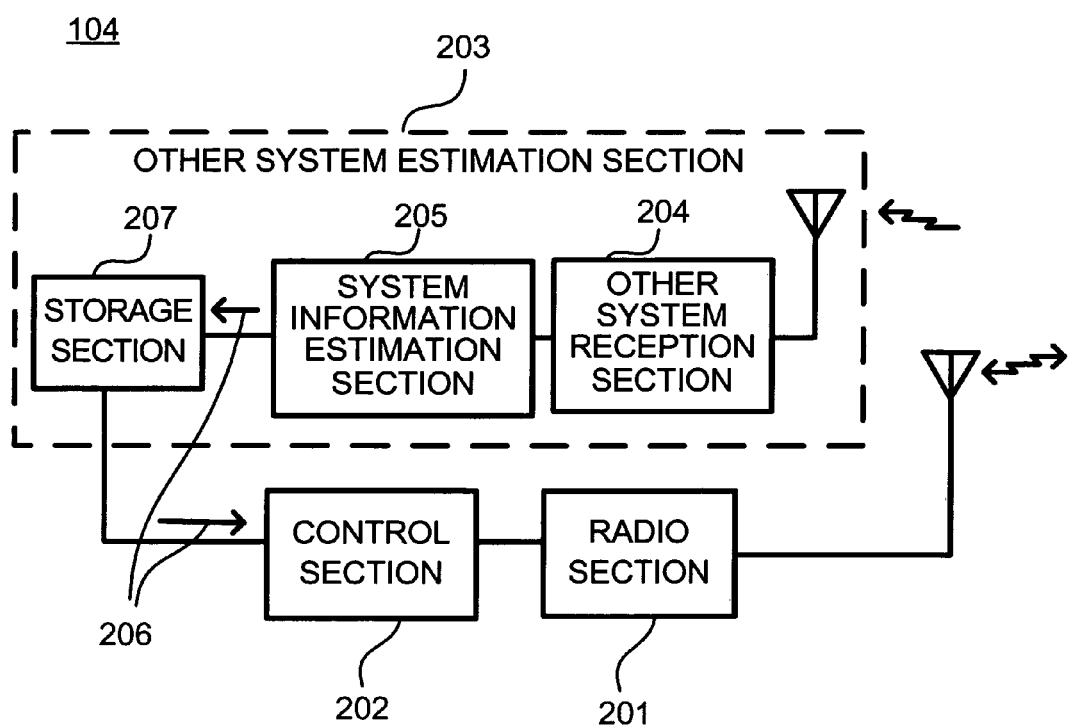
FIG. 2 is a block diagram showing an exemplary configuration of a base station of a radio communication system A in the first embodiment of the present invention.

FIG. 2 is a diagram showing an exemplary configuration of the base station 104 of the radio communication system A. In FIG. 2, the base station 104 is configured to include a radio section 201 that transmits and receives radio waves to/from the mobile station 101, a control section 202 that exercises control over signals coming and going from/to the radio section 201, and an other system estimation section 203 that estimates other radio communication systems. The radio section 201 and the other system estimation section 203 are connected to each other via the control section 202. The other system estimation section 203 is provided with an other system reception section 204 that receives radio waves coming from the base station 106 of the radio communication system B, a system information estimation section 205 that estimates system information of the radio communication system B, and a storage section 207 that stores system estimation information 206 being an output of the system information estimation section 205. The other system reception section 204 is connected to the system information estimation section 205. The system information estimation section 205 is connected with the storage section 207. The storage section 207 is connected with the control section 202. The other system reception section 204 receives radio waves coming from the base station 106 of the radio communication system B, and forwards a reception signal to the system information estimation section 205.

The system information estimation section 205 estimates the existence of the radio communication system B from information about the reception signal provided by the other system reception section 204, e.g., frequency band, channel width, slot interval, average power, peak factor, or hopping pattern. In the first embodiment of the invention, for example, because the radio communication system B is of GSM mode, the frequency band of the reception signal is any one of 450 MHz band, 480 MHz band, 850 MHz band, 900 MHz band, 1800 MHz band, and 1900 MHz band, and the channel width is 200 kHz. Such information is stored in advance in the system information estimation section 205, and the system information estimation section 205 performs scanning to see in which frequency band the reception signal is located. By checking the bandwidth of the reception signal, it becomes possible to estimate whether the radio communication system B is of GSM mode or not. The system information estimation section 205 outputs information about the estimated system as the system estimation information 206, and inputs the information into the storage section 207. The system estimation information 206 includes, for example, the communications mode of the estimated radio communication system (GSM mode in the example of the first embodiment), the frequency band in use by the estimated radio communication system, the channel frequency in use by the base station 106, and others. The storage section 207 transfers the system estimation information 206 in storage to the control section 202. By the radio section 201, the control section 202 informs the mobile station 101 of the system estimation information 206 provided by transfer from the storage section 207 using an information channel in use by the base station 104 of the radio communication system A. The mobile station 101 provided by the system estimation information 206 in advance from the base station 104 about the base station 106 of the radio communication system B as such can make effective switching from the radio communication system A to the radio communication system B.

Even when a new base station is provided to the radio communication system B, the base station 104 can autonomously estimate the existence of the base station by receiving radio waves of the base station newly provided to the radio communication system B, and by estimating its system information.

Note here that, other than being transferred over the information channel in use by the base station 104, the system estimation information 206 may be transferred as a part of data of any upper layer application.

Alternatively, the other system reception section 204 may receive radio waves from radio communication systems other than the radio communication system B. The system information estimation section 205 may estimate system information not belonging to the radio communication system B. With this being the case, the base station 104 of the radio communication system A can inform the existence of a plurality of radio communication systems.

Even when a new base station is provided not to the radio communication system B but to any other radio communication system, the base station 104 can autonomously estimate the existence of the base station by receiving radio waves of the base station newly provided not to the radio communication system B but to any other radio communication system, and by estimating its system information.

The base station includes a cellular or wireless LAN access point, or radio communication system in which base stations are of a similar cell size, for example.

The radio section 201 and the other system reception section 204 may be configured using a single multi-mode radio section, and the time-division technique may be applied for communications between mobile stations, and estimation of other radio communication systems. With this being the case, for example, the scanning operation may be performed for the radio communication system B while the radio communication system A is in an idle state for communications.

As an alternative configuration, a sector antenna may be used for an antenna of the base station 104, and every sector may be estimated with any other radio communication system, and system estimation information about any other radio communication system may be informed to every sector.

For switching by the mobile station among the radio communication systems, a switching may be made at a user's discretion with determination criteria of the fee, communications speed, or others of the radio communication system. Or the switching may be made automatically by the mobile station itself with a determination criterion of channel vacancy and power consumption of the radio communication system.

As described in the foregoing, in the first embodiment of the present invention, the base station of the radio communication system A receives radio waves from the base station of any other communications system, and estimates the other radio communication system. This allows switching among separate radio communication systems without a cable connection via a relay device or others, allows estimation of the existence of radio communication systems if newly provided, and allows effective switching among separate radio communication systems.

Second Embodiment

A second embodiment of the invention is an example in which, in an area where a radio communication system A with a wider communications cell (e.g., cellular phone) is in close proximity to or overlapping with a radio communication system B with a narrower communications cell (e.g., wireless LAN), a mobile station transmits system information of the communicated radio communication system B and the position information at the time of communications to the base station of the radio communication system A, and the base station of the radio communication system A informs the system information and the position information of the radio communication system B into the cell. By referring to FIGS. 3 to 5, such an example is described.

Figure 3:
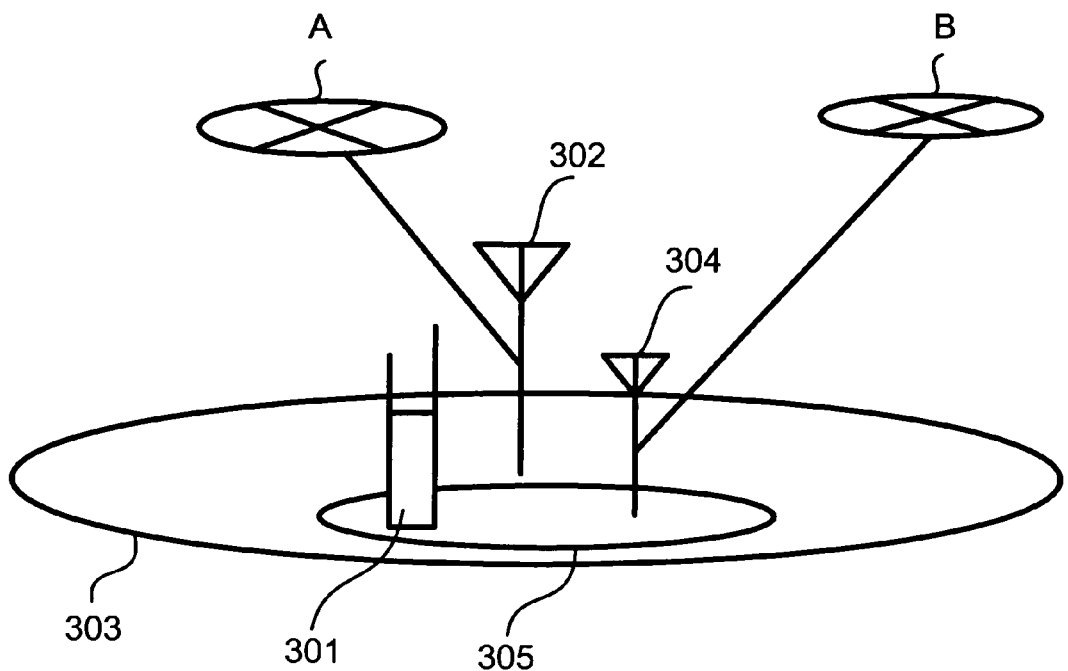
FIG. 3 is a schematic diagram of a radio communication system in a second embodiment of the invention.

FIG. 3 is a schematic diagram of a radio communication system in the second embodiment of the present invention. In FIG. 3, a mobile station 301 is capable of communications with both the first and second radio communication systems A and B, and is capable of detecting its own current position. A base station 302 of the radio communication system A communicates with the mobile station 301 being available for communications with the radio communication system A in a cell 303. A base station 304 of the radio communication system B communicates with the mobile station 301 being available for communications with the radio communication system B in a cell 305. The base stations 302 and 304 are not connected to each other over a cable, via a relay device, or others, and are operating asynchronously. Herein, as an example, the radio communication system B is assumed as being wireless LAN in an IEEE 802.11 system. The cell 305 is smaller compared with the cell 303, and is proximity thereto or overlapping therewith.

Figure 4:
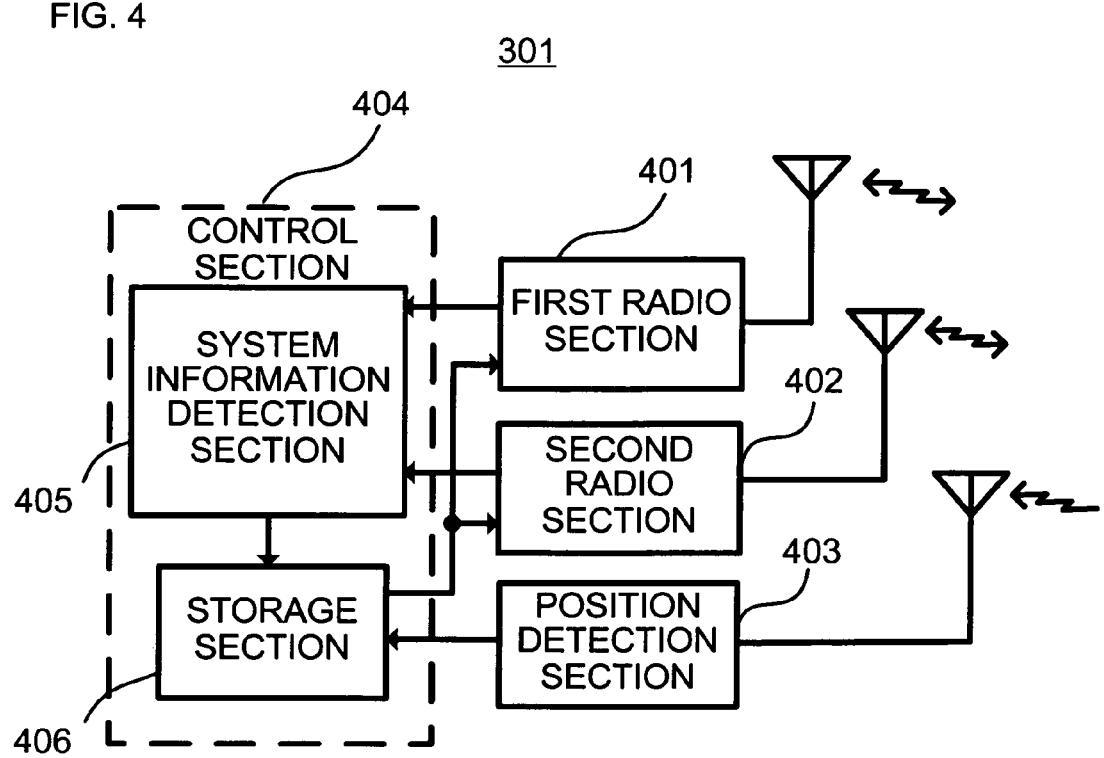
FIG. 4 is a block diagram showing an exemplary configuration of a mobile station in the second embodiment of the invention.

FIG. 4 is a block diagram showing an exemplary configuration of the mobile station 301. In FIG. 4, the mobile station 301 is provided with a first radio section 401 capable of communications with the radio communication system A, a second radio section 402 capable of communications with the radio communication system B, a position detection section 403 capable of detecting its own current position, and a control section 404 carrying therein a system information detection section 405 and a storage section 406. The first and second radio sections 401 and 402 are connected to the system information detection section 405 and the storage section 406, respectively. The position detection section 403 is connected to the storage section 406. The position detection section 403 detects absolute positions using a GPS, or detects relative positions based on delay amounts or others from a plurality of base stations of the radio communication system A.

When the mobile station 301 is connected to the base station 304 of the radio communication system B, a signal received by the second radio section 402 is input to the system information detection section 405. From thus input reception signal, the system information detection section 405 detects system information such as SSID (service set identifier, a key for network identification) of the base station 304, or mode (infrastructure mode or ad hoc mode) for output to the storage section 406. The storage section 406 stores, as system detection information, information combining the output system information and the position information being an output of the position detection section 403 when the system information is output.

When the mobile station 301 is in communications with the base station 304 of the radio communication system B, and is in a standby status with respect to the base station 302 of the radio communication system A, the control section 404 outputs the system detection information from the storage section 406 to the first radio section 401, and transmits the information to the base station 302 using the control channel of the base station 302.

When the mobile station 301 is in communications with the base station 304 of the radio communication system B, and when no communications are going on at all with the base station 302 of the radio communication system A, the storage section 406 stores the system detection information. When the mobile station 301 is through with communications with the base station 304 of the radio communication system B, and when a connection is established with the base station 302 of the radio communication system A, the control section 404 outputs the system detection information stored in the storage section 406 to the first radio section 401, and transmits the information to the base station 302 using the control channel of the base station 302.

Figure 5:
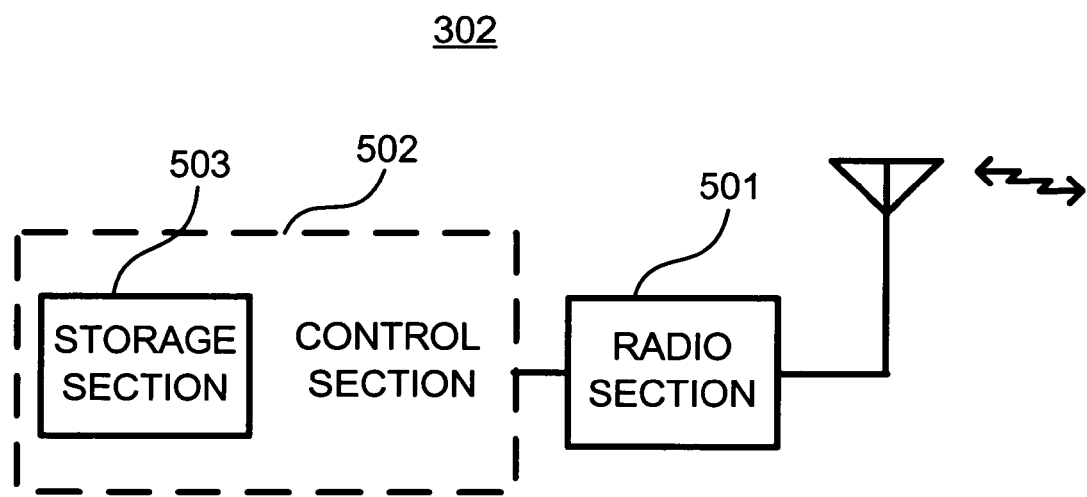
FIG. 5 is a block diagram showing an exemplary configuration of a base station of a radio communication system A in the second embodiment of the present invention.

FIG. 5 is a diagram showing an exemplary configuration of the base station 302 of the radio communication system A. In FIG. 5, the base station 302 is provided with a radio section 501 that transmits and receives radio waves to/from the mobile station 301, and a control section 502 carrying therein a storage section 503, and exercises control over signals incoming and going from/to the radio section 501. The storage section 503 stores the system detection information provided by the mobile station 301.

When the mobile station 301 is connected with the base station 302 of the radio communication system A, and when no communications are going on at all with the base station 304 of the radio communication system B, the control section 404 transmits the position information to the base station 302 using the control channel of the base station 302. Based on thus provided position information, the control section 502 searches the storage section 503 for system detection information showing a match to the position information, and informs the system information of the radio communication system B at the position where the mobile station 301 is located. The mobile station 301 provided in advance with the system detection information from the base station 302 of the radio communication system A about the base station 304 of the radio communication system B as such can perform effective switching from the radio communication system A to the radio communication system B.

Even when any new base station is provided to the radio communication system B, the mobile station 301 can autonomously detect the existence of the base station by communicating with the newly-provided base station of the radio communication system B, and by detecting its system information. The base station 302 can autonomously accumulate the system detection information of the newly-provided base station in the storage section 503.

By the base station 302 deriving the system detection information as such from a plurality of mobile stations, the storage section 503 of the base station 302 can store the correct area range of the cell 305 for communications for the base station 304 so that the information about the existence of the radio system B can be informed with more precision.

Exemplified herein is the case of informing the system information of the base station 304 of the radio communication system B using the radio communication system A. On the contrary, the system information of the base station 302 of the radio communication system A may be informed using the radio communication system B.

Note here that the first and second radio sections 401 and 402 of the mobile station 301 may transmit and receive radio waves to/from the radio communication systems other than the radio communication systems A and B. Moreover, the system information detection section 405 may detect system information of the radio communication systems other than the radio communication system B, and may output system information of a plurality of radio communication systems. With this being the case, the base station 302 of the radio communication system A can inform the existence of a plurality of radio communication systems.

The base station 301 can autonomously detect the existence of any newly-provided base station provided not to the radio communication system B but to any other radio communication system, and the base station 302 can autonomously accumulate the system detection information of the newly-provided base station into the storage section 503.

The first and second radio sections 401 and 402 are configured by a single multi-mode radio section, and may access the radio communication systems A and B in a time division manner.

Note that, other than being transferred over the control channel, the system detection information may be transferred as a part of data of any upper layer application. At this time, the system information of any other radio communication system in the cell 303 may be transferred from the base station 302 as a part of data of the application, and based on the position information of the mobile station 301 in the mobile station 301, the system information of any other radio communication system may be searched.

When the mobile station makes a switching of radio communication systems, the switching may be made at a user's discretion with determination criteria of the fee, communications speed, or others of the radio communication system. Or the switching may be made automatically by the mobile station itself with a determination criterion of channel vacancy and power consumption of the radio communication system.

As described in the foregoing, in the second embodiment of the present invention, a switching can be made among any separate radio communication systems without a cable connection via a relay device or others by a mobile station detecting system information of other radio communication systems through reception of radio waves from the base stations of the radio communication systems, and by the mobile station transmitting the system detection information to the base station of the radio communication system A. Further, the existence of any newly-provided radio communication system can be autonomously detected so that switching can be effectively made among any separate radio communication systems.

Third Embodiment

A third embodiment of the present invention is an example in which a mobile station in communications with the radio communication system A autonomously estimates the existence of other radio communication systems, the resulting information of the estimated other radio communication systems is transmitted to the base station of the radio communication system A, and the base station of the radio communication system A informs the system information of the radio communication system B into the cell. In the below, FIGS. 6 to 8 are referred to for description.

Figure 6:
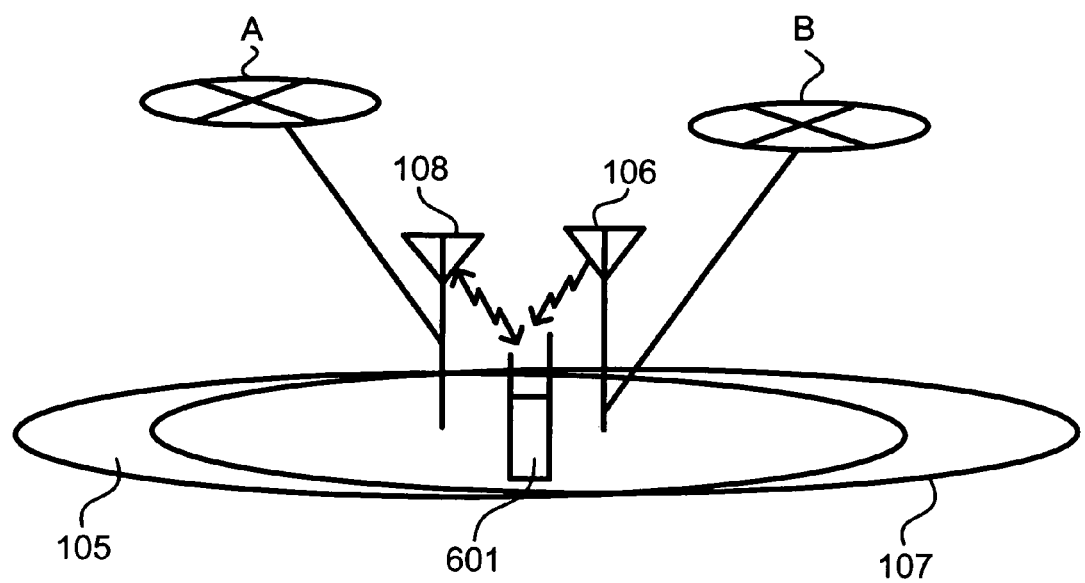
FIG. 6 is a schematic diagram of a radio communication system in a third embodiment of the present invention.

FIG. 6 is a schematic diagram of a radio communication system in a third embodiment of the present invention. In FIG. 6, a mobile station 601 is capable of communications with both the first and second radio communication systems A and B. The base station 108 of the radio communication system A communicates with the mobile station 601 being available for communications with the radio communication system A in the cell 105. The base station 106 of the radio communication system B communicates with the mobile station 601 being available for communications with the radio communication system B in the cell 107. The base stations 108 and 106 are not connected to each other over a cable or via a relay device or others, and operating asynchronous to each other. Herein, exemplified is a case where the radio communication system A is of a CDMA cellular mode, and the radio communication system B is of a GSM cellular mode. The cells 105 and 107 are positioned in close proximity to or overlapping each other. The mobile station 601 is located in an area where the cells 105 and 107 are overlapping each other, is connected with the base station 108, and is in communications therewith.

Figure 7:
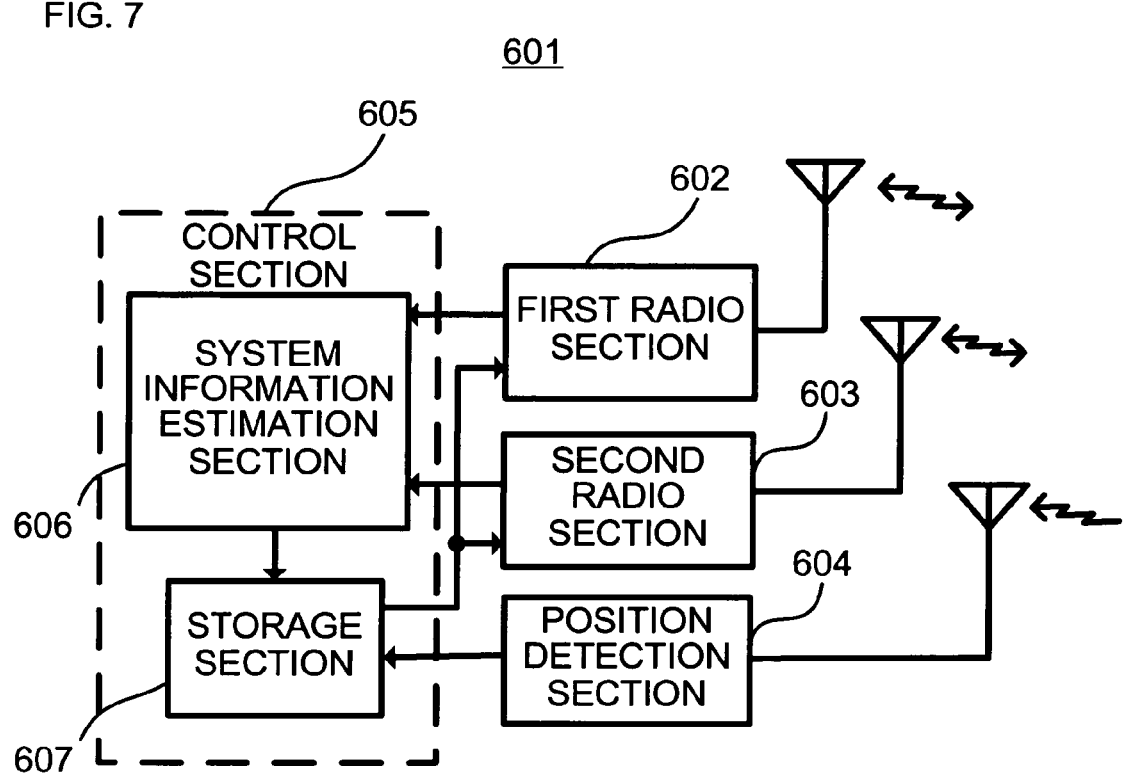
FIG. 7 is a block diagram showing an exemplary configuration of a mobile station in the third embodiment of the present invention.
Figure 8:
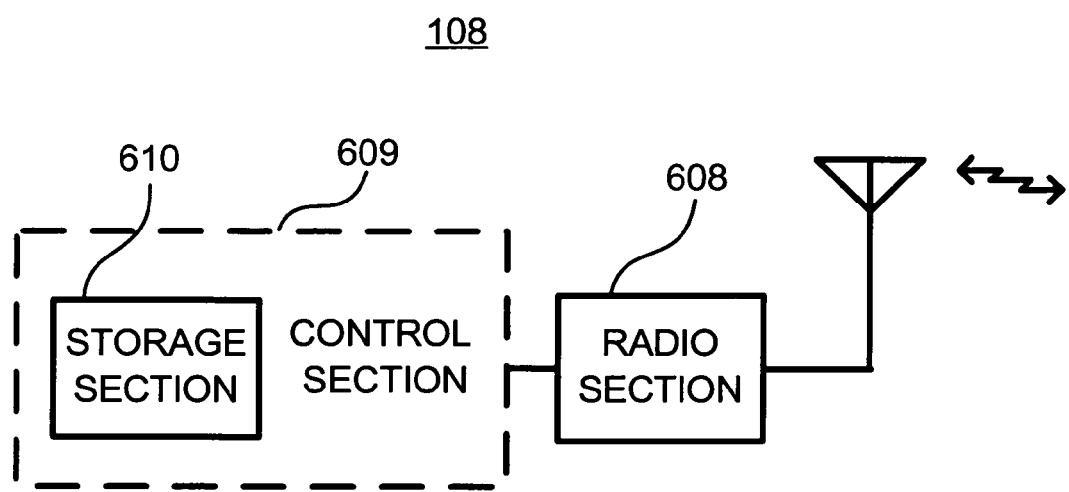
FIG. 8 is a block diagram showing an exemplary configuration of a base station of a radio communication system A in the third embodiment of the present invention.
Figure 9:
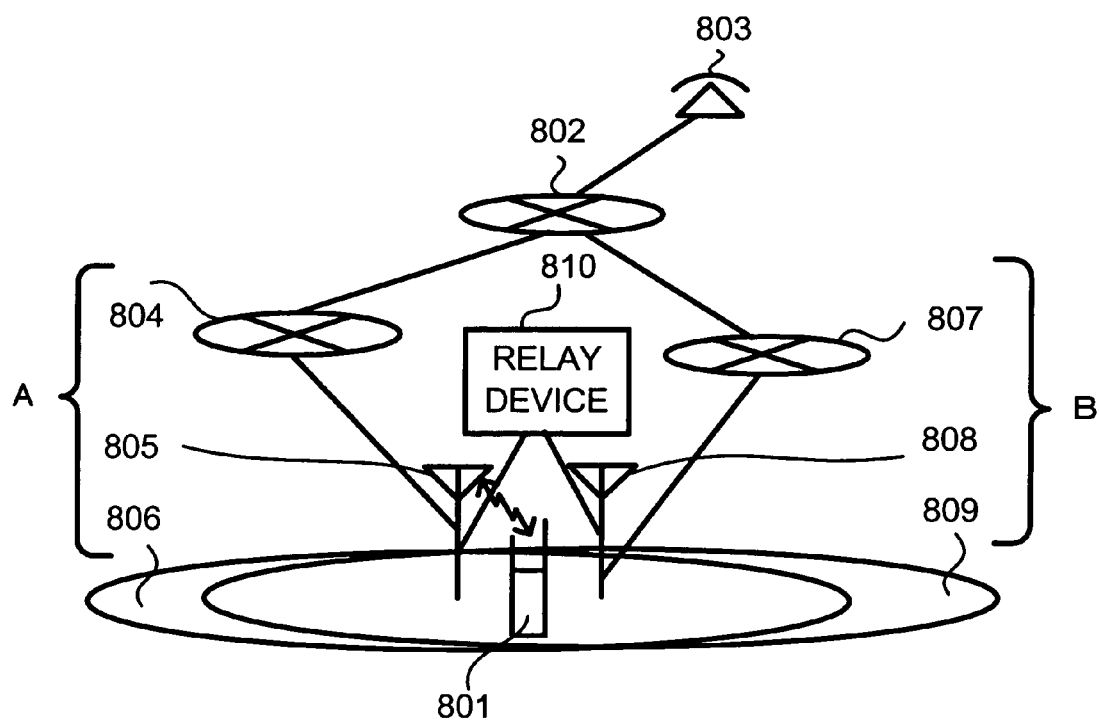
FIG. 9 is a schematic diagram of a radio communication system of a previous type.

FIG. 7 is a block diagram of an exemplary configuration of the mobile station 601. In FIG. 7, the mobile station 601 is provided with a first radio section 602 capable of communications with the radio communication system A, a second radio section 603 capable of communications with the radio communication system B, a position detection section 604 capable of detecting its own current position, and a control section 605 carrying therein a system information estimation section 606 and a storage section 607. The first and second radio sections 602 and 603 are connected to the system information estimation section 606 and the storage section 607, respectively. The position detection section 604 is connected to the storage section 607. The position detection section 604 detects absolute positions using a GPS, or detects relative positions based on delay amounts or others from a plurality of base stations of the radio communication system A. Even being in communications with the base station 108, the mobile station 601 can receive radio waves of the base station 106 from the second radio section 603. Note here that the second radio section 603 is not necessary to be always in the reception state, and may be turned into the reception state after a certain period of time.

The system information estimations section 606 estimates the existence of the radio communication system B from information about a reception signal provided by the base station 106, e.g., frequency band, channel width, slot interval, average power, peak factor, or hopping pattern. In the third embodiment of the present invention, for example, because the radio communication system B is of GSM mode, the frequency band for use is any one of 450 MHz band, 480 MHz band, 850 MHz band, 900 MHz band, 1800 MHz band, and 1900 MHz band, and the channel width is 200 kHz. Such information is stored in advance in the system information estimation section 606, and the system information estimation section 606 performs scanning to see in which frequency band the reception signal is located. By checking the bandwidth of the reception signal, it becomes possible to estimate whether the radio communication system B is of GSM mode or not. The system information estimation section 606 outputs system information about the estimated system to the storage section 607. Specifically, the system information includes the communications mode of the estimated radio communication system (GSM mode in the example of the third embodiment), the frequency band in use by the estimated radio communication system, the channel frequency in use by the base station 106, and others. The storage section 607 stores, as system estimation information, information combining the output system information and the position information being an output of the position detection section 403 when the system information is output.

When the mobile station 601 is in communications with the base station 106 of the radio communication system B, and is in a standby status with respect to the base station 108 of the radio communication system A, the control section 605 outputs the system estimation information from the storage section 607 to the first radio section 602, and transmits the information to the base station 108 using the control channel of the base station 108.

When the mobile station 601 is in communications with the base station 106 of the radio communication system B, and when no communications are going on at all with the base station 108 of the radio communication system A, the storage section 607 stores the system estimation information. When the mobile station 601 is through with communications with the base station 106 of the radio communication system B, and when a connection is established with the base station 108 of the radio communication system A, the control section 605 outputs the system estimation information stored in the storage section 607 to the first radio section 602, and transmits the information to the base station 108 using the control channel of the base station 108.

FIG. 8 is a diagram showing an exemplary configuration of the base station 108 of the radio communication system A. In FIG. 8, the base station 108 is provided with a radio section 608 that transmits and receives radio waves to/from the mobile station 601, and a control section 609 carrying therein a storage section 610, and exercises control over signals incoming and going from/to the radio section 608. The storage section 610 stores the system estimation information and the position information provided by the mobile station 601. The base station 108 informs the system estimation information stored in the storage section 610 to the mobile station 601 in the cell 105 from the radio section 608. In this manner, the mobile station 601 provided by the system estimation information in advance can perform switching effectively from the radio communication system A to the radio communication system B.

Even when any new base station is provided to the radio communication system B, the mobile station 601 can autonomously estimate the existence of the base station by receiving radio waves of the newly-provided base station of the radio communication system B, and by estimating its system information. The base station 108 can autonomously accumulate the system estimation information of the newly-provided base station in the storage section 610.

Exemplified herein is the case of informing the system estimation information of the base station 106 of the radio communication system B using the radio communication system A. On the contrary, the system estimation information of the base station 108 of the radio communication system A may be informed using the radio communication system B.

Note here that the first and second radio sections 602 and 603 may transmit and receive radio waves to/from the radio communication systems other than the radio communication systems A and B. Moreover, the system information estimation section 606 may estimate system information of the radio communication systems other than the radio communication system B, and may output system estimation information of a plurality of radio communication systems. With this being the case, the base station 108 of the radio communication system A can inform the existence of a plurality of radio communication systems.

The base station 601 can autonomously estimate the existence of the newly-provided base station not to the radio communication system B but to any other radio communication system, and the base station 108 can autonomously accumulate the system estimation information of the newly-provided base station.

The first and second radio sections 602 and 603 are configured by a single multi-mode radio section, and may access the radio communication systems A and B in a time division manner.

Note that the system estimation information may be transferred using a part of data of any upper layer application.

For switching by the mobile station among the radio communication systems, a switching may be made at a user's discretion with determination criteria of the fee, communications speed, or others of the radio communication system. Or the switching may be made automatically by the mobile station with a determination criterion of channel vacancy and power consumption of the radio communication system.

As described in the foregoing, in the third embodiment of the present invention, a switching can be made among any separate radio communication systems without a cable connection via a relay device or others by a mobile station estimating system information of other radio communication systems through reception of radio waves from the base stations of the radio communication systems, and by the mobile station transmitting the system estimation information to the base station of the radio communication system A. Further, the existence of any newly-provided radio communication system can be autonomously estimated so that switching can be effectively made among any separate radio communication systems.

INDUSTRIAL APPLICABILITY

The present invention has effects of achieving a switching among separate radio communication systems without a cable connection or via a relay device or others, and effects of achieving effective switching among separate radio communication systems through detection of the existence of any newly-provided radio communication system. It is considered useful as a radio communication system, a base station, and a mobile station.

The invention claimed is:

1. A radio communication system, comprising:
a base station of a first radio communication system;
a base station of a second radio communication system including a cell being in close proximity to or overlapping a cell for communications by the base station of the first radio communication system, and operating asynchronous to the base station of the first radio communication system; and
a mobile station capable of communications with both the first and second radio communication systems, wherein the mobile station includes:
a radio section that receives a radio wave from each of the first and second radio communication systems; and
a system information estimation section that scans a plurality of radio frequencies to determine a frequency of the radio wave received from the second radio communication system, determines a communication mode of the second radio communication system based on the determined frequency, and transmits the determined communication mode as system estimation information to the base station in the first radio communication system,
the base station of the first radio communication system includes:
a storage section that stores the system estimation information provided by the mobile station, and
wherein the base station of the first radio communication system transmits the system estimation information to the mobile station in the cell, and the mobile station switches from the first radio communication system to the second radio communication system based on the system estimation information.

2. The radio communication system according to claim 1, wherein:
the mobile station includes a position detection section that detects position information of the mobile station,
the base station of the first radio communication system includes a storage section that stores the system estimation information and the position information transmitted by the mobile station, and
wherein the base station of the first radio communication system transmits the stored system estimation information to the position of the mobile station in the cell, and the mobile station switches from the first radio communication system to the second radio communication system based on the system estimation information.

3. A mobile station capable of communications with both a base station of a first radio communication system, and a base station of a second radio communication system including a cell being in close proximity to or overlapping a cell for communications by the base station of the first radio communication system, and operating asynchronous to the base station of the first radio communication system, comprising:
a radio section that receives a radio wave from each of the first and second radio communication systems; and
a system information estimation section that scans a plurality of radio frequencies to determine a frequency of the radio wave received from the second radio communication system, determines a communication mode of the second radio communication system based on the determined frequency, and transmits the determined communication mode as system estimation information to the base station of the first radio communication system, wherein
the mobile station switches from the first radio communication system to the second radio communication system based on the system estimation information transmitted by the base station of the first radio communication system back to the mobile station.

4. The mobile station according to claim 3, comprising a position detection section that detects position information of the mobile station, wherein
the mobile station transmits the position information to the base station of the first radio communication system, and the mobile station switches from the first radio communication system to the second radio communication system based on the system estimation information, the system estimation information transmitted by the base station of the first radio communication system to the mobile station in response to receiving the position information.

5. The mobile station according to claim 4, wherein
the position detection section detects absolute position information.

6. The mobile station according to claim 4, wherein
the position detection section detects relative position information from the base station.

7. A mobile station capable of communications with both a base station of a first radio communication system, and a base station of a second radio communication system including a cell being in close proximity to or overlapping a cell for communications by the base station of the first radio communication system, and operating asynchronous to the base station of the first radio communication system, comprising
a radio section that receives a radio wave from each of the first and second radio communication systems;
a system information estimation section that scans a plurality of radio frequencies to determine a frequency of the radio wave received from the second radio communication system, determines a communication mode of the second radio communication system based on the determined frequency, and transmits the determined communication mode as system estimation information to the base station of the first radio communication system; and a storage section that stores the system estimation information, wherein the mobile station stores the system estimation information in the storage section when no communications are going on with the base station of the first radio communication system, and transmits the system estimation information stored in the storage section to the base station of the first radio communication system when communications with the base station of the second radio communication system are complete, and the mobile station switches from the first radio communication system to the second radio communication system based on the system estimation information transmitted by the base station of the first radio communication system back to the mobile station.

8. The mobile station according to claim 7, comprising a position detection section that detects position information of the mobile station, wherein the mobile station stores the system detection information in the storage section when no communications are going on with the base station of the first radio communication system, and transmits the system estimation information and the position information stored in the storage section to the base station of the first radio communication system when communications are through with the base station of the second radio communication system, and the mobile station switches from the first radio communication system to the second radio communication system based on the system estimation information, the system estimation information transmitted by the base station of the first radio communication system to the mobile station in response to receiving the position information.

9. The mobile station according to claim 8, wherein
the position detection section detects absolute position information.

10. The mobile station according to claim 8, wherein
the position detection section detects relative position information from the base station.

11. The radio communication system according to claim 2, wherein
the position detection section detects absolute position information.

12. The radio communication system according to claim 2, wherein
the position detection section detects relative position information from the base station.

* * * * *